UNITED STATES PATENT OFFICE.

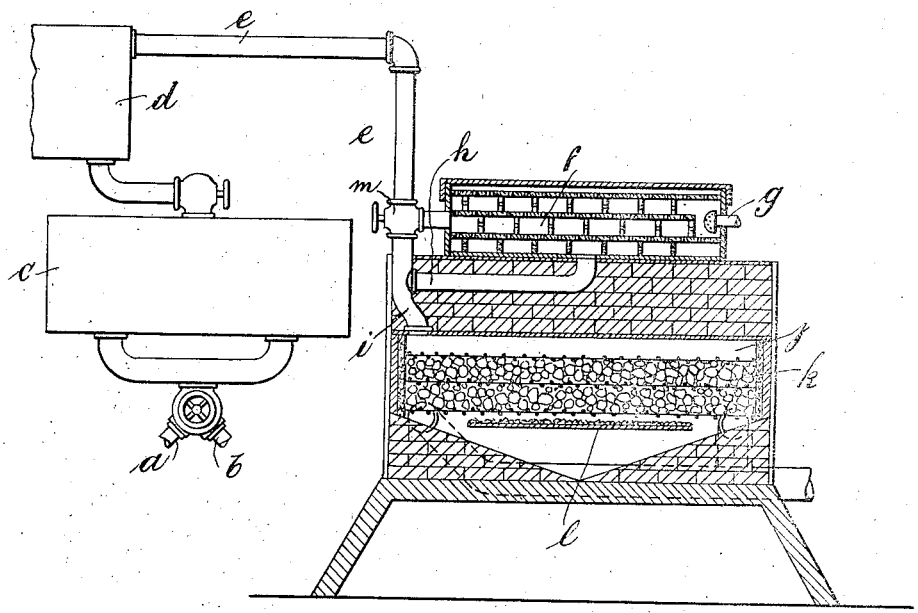

MICHAEL W. MURRAY, OF NEW YORK, N. Y., ASSIGNOR OF FIFTY ONE-HUNDREDTHS TO GEORGE H. ROSENBLATT, OF NEW YORK, N. Y.

PROCESS OF PRODUCING CALCIUM CARBID.

1,060,206. Specification of Letters Patent. Patented Apr. 29, 1913.

Application filed January 30, 1912. Serial No. 674,346.

*To all whom it may concern:*

Be it known that I, MICHAEL W. MURRAY, a citizen of the United States of America, and a resident of New York, county and State of New York, have invented certain new and useful Improvements in Processes of Producing Calcium Carbid, of which the following is a specification.

This invention has reference to a novel process of producing high heat from gas mixtures.

It pertains particularly to the production of such high temperatures as are required for instance in the manufacture of calcium carbid, carborundum and the like.

Processes of this kind are purely thermal ones and the cost of production depends entirely on the method employed for generating the caloric energy to which the mixture of the prepared components of the substance to be made is subjected, usually for fusion. Such high temperatures are for example produced with the electric arc. However the generation of the current, even by water power, is relatively expensive and therefore the application of the final product limited and in some instances its cost of production prohibitive.

It is the purpose of the present invention to produce such high temperatures at a greatly reduced cost according to purely chemical methods. This has been primarily attained by novel gas mixtures used in connection with the surface combustion process. The burning through surface resistance of a gas mixture or of an explosive mixture of air and gas produces exceedingly high temperatures. To this mixture there may be added either directly or by carbureting, quick burning or detonating explosive substances or compounds, which are susceptible to evaporation under the conditions attending the various phases of the new process for the purpose of obtaining the enormous amount of heat contained therein. By subjecting these vapors to combustion through surface resistance novel heat effects are produced at a relatively low cost. With a gas mixture such as carbureted water gas to which there is added a volume of air somewhat in excess of that necessary to produce an explosive mixture, temperatures of 2,500° C. are attained. Temperatures beyond 2,500° C. and up to 4,000° C. are attainable, when the gas or gases of the explosive mixture of gas and air, are of the aromatic series which are compounds derived from benzene, $C^6H^6$; having one or more closed rings or nuclei per molecule and more particularly hydrocarbon gases of the fatty series which are compounds derived from methane, $CH^4$; with double or treble bond linkings or atomic affinities saturated between carbon atoms in the molecule;

$$\overset{|}{C}=\overset{|}{C}, -C\equiv C-;$$ and finally the vapors of explosive substances or compounds, as for instance the vapors of picric acid when such gases or explosive vapors form components of the gas mixture, composed of gases rich in carbon, for example hydrocarbon gases which are subjected to the surface combustion process, then exceedingly high temperatures may be reached.

In order to render the invention entirely clear reference is made to the accompanying drawing in which an apparatus is diagrammatically illustrated that may be used in carrying out the present process.

In the drawing *a* represents the air inlet, *b* the gas inlet, *c* the mixing chamber, *d* the superheater and *e, e*, conducting pipes leading from the superheater to the carbureter *f*. A spray valve *g* is adapted to issue carbureting mixtures or gases into the air and gas mixture. A pipe *h* leads from the carbureter into a pipe *i* from which the gas mixture passes into a chamber *j* partly filled with refractory substances *k*. In this bed of refractory materials surface combustion takes place. The materials subjected to the excessive high heat generated passes below the bed of refractory material on a conveyer *l*. If it is desired superheated gas and air mixtures may be used directly. In this instance the valve *m* in the pipe *e* is operated to close off the carbureter either wholly or partly.

In carrying this invention into effect I substantially proceed as follows: I mix gas composed essentially of carbon monoxid and hydrogen with air. This mixture is passed through the superheater so that it acquires a certain temperature. The heated mixture is now carbureted for the purpose of making it rich in carbon. This gas mixture may for certain purposes be directly subjected to the surface combustion process. In other instances where higher temperatures are required vapors of explosive substances or compounds may be mixed with the above described gas mixture before it is combusted through the surface resistance in this process. For instance vapors of picric acid, 2—4—6 trinitrophenol may be used for carbureting said gas mixture.

The approximate proportions in which the gases are mixed with air and picric acid or other explosives are as follows: With a gas mixture consisting of uncarbureted water gas, $COH^2$ the volume of air is just slightly in excess of that necessary to form an explosive mixture. By means of this gas mixture the highest temperature attainable is reached when the air volume therein is such as to support combustion even in an atmosphere of carbon dioxid gas, $CO^2$. When the explosive mixture of gas and air is carbureted with gases of the aromatic series which may be produced for instance from naphthalene, $C^{10}H^8$, I add five cubic feet of air for every half cubic foot of gas. For gases with double bond linkings of the fatty series, for instance ethylene, $C^2H_4$ or when a treble bonded gas is used like acetylene $C^2H^2$ sufficient air must be added to combust all the carbon in these gases. When explosive substances such as picric acid vapors are mixed with the gas the air added thereto must be in excess of that necessary for combusting all the carbon in the gas. It is of course understood that these additions of air are in excess of the volume of air already imparted to the gas for the purpose of rendering it an explosive mixture. In using the vapors of explosive substances such for instance as picric acid the vapor of the substance is imparted to the gas mixture either by superheating the gas mixture to a temperature at which the substance vaporizes and thus charge the gas mixture with the vapor of the substance by contact, or by superheating the gas mixture to a fairly high temperature and causing the gas mixture so heated to pass through a carbureter constructed of checker-work fire brick for instance. Over the surface of the carbureter there is being simultaneously sprayed alcohol or gasolene or other liquids whose properties permit of carrying picric acid in solution.

When explosive mixtures of gas and air, or any such mixture with the additions of air and gases of the aromatic series, gases of double bond linkings, gases of treble bond linkings, vapors of explosive substances such as for instance of picric acid are forced under pressure through a bed of refractory substances, for instance small pieces of magnesia, and ignited, then surface combustion takes place. On emerging from the place of combustion temperatures are produced which will permit of the very economical production of such compounds as calcium carbid, etc. The reaction taking place during the formation of calcium carbid is as follows:

$$CaO + 3C = C^2Ca + CO.$$

This product thus is made at a greatly reduced cost according to purely chemical methods.

I claim as my invention:—

1. The process of producing high temperatures by purely chemical methods for technical purposes consisting in superheating and carbureting explosive gas mixtures and combusting them through surface resistance where contact action takes place, generating thus enormous caloric energy.

2. The process of producing chemically very high temperatures adapted for the production of calcium carbid and the like consisting in superheating and carbureting explosive gas mixtures and combusting them through surface resistance formed of a bed of heated small pieces of magnesia where contact action takes place, generating thus enormous caloric energy.

3. The process of producing chemically very high temperatures adapted for the production of calcium carbid and the like consisting in superheating explosive gas mixtures, carbureting them partly with picric acid vapors, and subjecting the said mixtures to combustion through surface resistance where contact action takes place generating thus enormous caloric energy.

4. The process of producing chemically very high temperatures for the production of calcium carbid and the like consisting in superheating explosive gas mixtures, carbureting them partly with picric acid vapors, and subjecting the said mixtures while under pressure to combustion through surface resistance where contact action takes place, generating thus enormous caloric energy.

5. The process of producing chemically very high temperatures adapted for the production of calcium carbid and the like consisting in superheating explosive gas mixtures, carbureting them partly with picric acid vapors, and subjecting the said mixtures to combustion through surface resistance formed of a bed of heated small pieces of magnesia where contact action takes place, generating thus enormous caloric energy.

6. The process of producing chemically very high temperatures adapted for the production of calcium carbid and the like consisting in superheating explosive gas mixtures, carbureting them partly with picric acid vapors, and subjecting the said mixtures while under pressure to combustion through surface resistance formed of a bed of heated small pieces of magnesia, where contact action takes place, generating thus enormous caloric energy.

Signed at New York, N. Y., this 27th day of January 1912.

MICHAEL W. MURRAY.

Witnesses:
 EMMA A. McCARRICK,
 MARIE H. LEHR.